United States Patent [19]

Sunami et al.

[11] 4,384,868

[45] May 24, 1983

[54] REACTIVE DYE COMPOSITION AND ITS USE FOR DYEING

[75] Inventors: Masaki Sunami, Toyonaka; Takemi Tokieda, Nara; Sadaharu Abeta, Toyonaka, all of Japan

[73] Assignee: Sumitomo Chemical Company, Limited, Osaka, Japan

[21] Appl. No.: 356,345

[22] Filed: Mar. 9, 1982

[30] Foreign Application Priority Data

Mar. 17, 1981 [JP]  Japan .................................. 56/38981

[51] Int. Cl.³ ...................... D06P 67/02; C09B 62/00
[52] U.S. Cl. .......................................... 8/524; 8/527; 8/549; 8/589; 8/641; 8/918
[58] Field of Search ................... 8/527, 549, 589, 641, 8/524

[56] References Cited

U.S. PATENT DOCUMENTS

| | | | |
|---|---|---|---|
| 4,088,441 | 5/1978 | Meininger et al. | 8/549 |
| 4,283,195 | 8/1981 | Nakatsuka et al. | 8/524 |
| 4,349,349 | 9/1982 | Nakatsuka | 8/527 |
| 4,351,640 | 9/1982 | Schaffer et al. | 8/524 |

*Primary Examiner*—A. Lionel Clingman
*Attorney, Agent, or Firm*—Stevens, Davis, Miller & Mosher

[57] ABSTRACT

A reactive dye composition containing a dye mixture comprising 60 to 97 wt. % of C.I. Reactive Orange 16 and 40 to 3 wt. % of C.I. Reactive Orange 7, and 5 to 100 parts by weight per 100 parts by weight of said dye mixture of a naphthalenesulfonic acid/formaldehyde condensate having a sulfonation degree of 100 to 200%, which is very readily soluble in water and an aqueous alkaline solution and useful for dyeing cellulose fibers with a high color yield.

5 Claims, No Drawings

REACTIVE DYE COMPOSITION AND ITS USE FOR DYEING

The present invention relates to a reactive dye composition and a method for dyeing cellulosic fibers with the same.

More particularly, it relates to a C.I. Reactive Orange 16-containing dye composition which dissolves very well in water and aqueous alkali liquors and gives a high color yield, and a method for dyeing cellulosic fibers with the same.

Reactive dyes can be fixed on cellulosic fibers by various means to afford dyed products of high brilliancy and high wet fastness, and therefore they have been extensively used for dyeing and printing cellulosic fibers.

Recently, an energy-saving is regarded as important in the dyeing field, and a dyeing method has shifted to a one-bath method for continuous dyeing, and to a one-phase method for printing. Particularly, a cold-pad-batch method attracts attention recently. In these dyeing methods, it is necessary for reactive dyes used to have a good dissolution property in water and aqueous alkali liquors at low temperatures and moreover the resulting dye solution should be stable. In carrying out, for example, the cold-pad-batch method, the dyes should dissolve in amounts not less than at least 50 parts by weight in 1000 parts by weight of an aqueous solution containing sodium hydroxide, sodium carbonate, sodium silicate or trisodium phosphate and electrolytes.

C.I. Reactive Orange 16 is useful for dyeing cellulose fibers orange, but it is poor in the dissolution property in such aqueous alkali liquors, making it very difficult to obtain deep dyed products which are uniform and free from uneven spots. As a method for improving the dissolution property, it is generally, known to mix naphthalenesulfonic acid/formaldehyde condensates with the reactive dyes. But, because of the solubility of C.I. Reactive Orange 16 being essentially low, improvement of the dissolution property in the alkali liquors is difficult even by the addition of large amounts of such condensates.

While C.I. Reactive Orange 7 is also known as orange reactive dye. But it is poor, like C.I. Reactive Orange 16, in the dissolution property in aqueous alkali liquors, and the dissolution property thereof also can not be improved even by the addition of large amounts of the aforesaid condensates, making it very difficult to obtain deep dyed products which are uniform and free from uneven spots in the cold-pad-batch method.

The present inventors have extensively studied to improve the dissolution property of C.I. Reactive Orange 16 in water and aqueous alkali liquors, and as a result found that a dye composition comprising a mixture of C.I. Reactive Orange 16 and C.I. Reactive Orange 7, and a condensate of formaldehyde with alkylated or nonalkylated naphthalenesulfonic acid, is very good in the dissolution property and can be used for dyeing cellulosic fibers to give dyed products of very high color yield.

The present invention provides a reactive dye composition containing a dye mixture comprising 60 to 97 wt.% of C.I. Reactive Orange 16 and 40 to 3 wt.% of C.I. Reactive Orange 7, and 5 to 100 parts by weight per 100 parts by weight of said dye mixture, of a naphthalenesulfonic acid/formaldehyde condensate having a sulfonation degree of 100 to 200%, and a method for dyeing cellulosic fibers with the reactive dye composition.

The present invention is illustrated in detail as follows.

C.I. Reactive Orange Nos. 16 and 7 are dyes represented by a free acid of the following formulae, respectively:

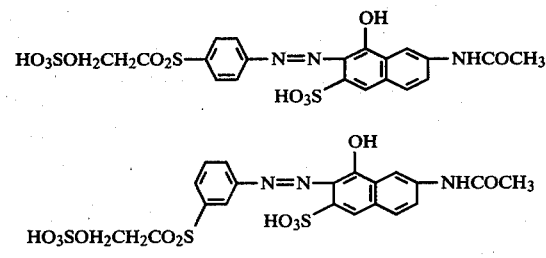

The naphthalenesulfonic acid usable in the production of the condensate may be alkylated and includes naphthalenesulfonic acid, methylnaphthalenesulfonic acid, ethylnaphthalenesulfonic acid, propylnaphthalenesulfonic acid and butylnaphthalenesulfonic acid, of which methylnaphthalenesulfonic acid is most preferred. These naphthalenesulfonic acids are generally used in the form of a salt of alkali metals (e.g. sodium, potassium) or ammonium salt. Also, they may be used each alone or in a mixture of two or more.

The condensation between the (alkyl)naphthalenesulfonic acid and formaldehyde may be carried out in a manner known per se.

The sulfonation degree [a sulfonation degree of 100% refers to a case where 1 mole of sulfonic acid has attached to 1 mole of (alkyl)naphthanele] of said naphthalenesulfonic acids is 100 to 200% in a mean value.

The reactive dye composition of the present invention may be obtained by thoroughly mixing, by usual means, a dye mixture comprising 60 to 97 wt.%, preferably 80 to 95 wt.% of C.I. Reactive Orange 16 and 3 to 40 wt.%, preferably 5 to 20 wt.% of C.I. Reactive Orange 7, and the foregoing naphthalenesulfonic acid/formaldehyde condensate.

The amount of the condensate used is 5 to 100 parts by weight, preferably 10 to 50 parts by weight, per 100 parts by weight of the dye mixture.

The dye composition of the present invention may contain hydrotropic agents (e.g. urea, thiourea), surface active agents, sequestering agents (e.g. sodium tripolyphosphate, sodium hexametaphosphate), buffers (e.g. disodium hydrogen phosphate) or/and other additives giving little or no effect on dissolution of the compositions (e.g. dextrin, sucrose). Further, it may contain electrolytes, e.g. sodium chloride and sodium sulfate, and dedusting agents such as mineral oil emulsions, so long as they give no adverse effect to the dissolution property of the present dye composition.

The reactive dye composition of the present invention thus obtained exhibits excellent dissolution property in water and aqueous alkali liquors, and may be used for dyeing cellulosic fibers to give dyed products of uniformity and high color yield. The dyeing of cellulosic fibers may be carried out by usual printing, exhaustion dyeing or continuous dyeing methods including the cold-pad-batch method.

The present invention is illustrated in more detail with reference to the following examples. Parts in the examples are by weight.

EXAMPLE 1

To 76 parts of 80%-purity C.I. Reactive Orange 16 (sodium salt) and 10 parts of 73%-purity C.I. Reactive Orange 7 (sodium salt) were added 13 parts of a condensate (sodium salt) of formaldehyde with methylnaphthalenesulfonic acid having a sulfonation degree of 150% and 1 part of a mineral oil emulsion. The mixture was thoroughly mixed to obtain a dye composition.

(1) 130 g of the dye composition obtained was dissolved in hot water, followed by making up to 1000 ml with water. This dye solution was allowed to cool at 25° to 30° C. for a whole day and night, but it remained stable without any dye deposition.

In the same manner as above, a solution prepared from a dye composition containing no C.I. Reactive Orange 7 was allowed to stand for a whole day and night whereby there was observed a great dye deposition, and the solubility of the dye composition was found to be 100 g/l.

(2) 80 g of the above dye composition of the present invention was dissolved in hot water, followed by cooling to 25° C. Thereafter, 20 ml of 32.5% sodium hydroxide and 30 g of anhydrous sodium sulfate were added to the dye solution, which was then made up to 1 liter with water at 25° C.

Immediately thereafter, cotton poplin was dipped into the dye liquor, squeezed to a pick-up of 70%, batched up, tightly wrapped with polyethylene film and allowed to stand at 25° C. for 20 hours in a room. Thereafter, the dyed product was washed with cold water and then with hot water, and soaped at 95° to 98° C. in a detergent bath, followed by washing with cold water and drying. A uniform and deep orange colored cotton poplin was obtained.

While with the dye composition containing no C.I. Reactive Orange 7, it was dissolved in only less than 30 g/l in the presence of said alkali, and immediately after alkali addition, dye aggregates were formed to make it impossible to achieve evey dyeing.

EXAMPLE 2

To 76 parts of 80%-purity C.I. Reactive Orange 16 (sodium salt) and 10 parts of 40%-purity C.I. Reactive Orange 7 (sodium salt) were added 13 parts of a condensate (sodium salt) of formaldehyde with methylnaphthalenesulfonic acid having a sulfonation degree of 150% and 1 part of a mineral oil emulsion. The mixture was thoroughly mixed to obtain a dye composition.

(1) 130 g of the dye composition obtained was dissolved in hot water, followed by making up to 1000 ml with water.

This dye solution was allowed to stand for a whole day and night, but it remained stable without any dye deposition.

(2) A print paste was prepared using said dye composition according to the following recipe:

| | |
|---|---|
| Dye composition | 80 parts |
| Urea | 50 parts |
| Thickening paste | 550 parts |
| Hot water | 300 parts |
| Sodium hydrogen carbonate | 20 parts |
| | 1000 parts |

After standing for a whole day and night, the print paste was printed on cotton poplin by a usual method, followed by steaming at 100° C. for 5 minutes. The poplin was then washed with water and then with warm water, soaped and washed with warm water and then with water, followed by drying. The cotton poplin was dyed in uniform and extremely deep orange shades.

While with a dye composition containing no C.I. Reactive Orange 7, dye aggregates were deposited only 4 hours after the preparation of alkaii paste. And, when printing was carried out using the paste which had been allowed to stand for a whole day and night, the color yield was low to result in uneven dyeing.

(3) 0.8 g of said dye composition of the present invention was dissolved in hot water, followed by making up to 200 ml with water.

To this dye solution was added 10 g of anhydrous sodium sulfate, and then 10 g of unmercerized cotton knittings was dipped into the dye bath which was then heated to 45° C. with stirring. Twenty minutes after temperature-rise, 4 g of soda ash was added and exhaustion dyeing was carried out for 60 minutes.

Thereafter, the dyed product was washed with water and then with warm water, soaped and washed with warm water and then with water, followed by drying. The unmercerized cotton knittings was dyed in orange shades of uniformity and high color yield.

While with a dye composition containing no C.I. Reactive Orange 7, dye aggregates were formed immediately after the addition of soda ash, and dyed products of extremely low color yield were obtained.

What is claimed is:

1. A reactive dye composition containing a dye mixture comprising 60 to 97 wt.% of C.I. Reactive Orange 16 and 40 to 3 wt.% of C.I. Reactive Orange 7, and 5 to 100 parts by weight per 100 parts by weight of said dye mixture of
   a naphthalenesulfonic acid/formaldehyde condensate having a sulfonation degree of 100 to 200%.

2. The composition according to claim 1, wherein the naphthalenesulfonic acid is at least one member selected from naphthalenesulfonic acid and methyl-, ethyl-, propyl- and butyl-naphthanelesulfonic acids.

3. The composition according to claim 1, wherein the composition further contains at least one member selected from hydrotropic agents, surface active agents, sequestering agents, buffers, electrolytes, dedustering agents and other additives.

4. A method for dyeing cellulose fibers, which comprises using a reactive dye composition containing a dye mixture comprising 60 to 97 wt.% of C.I. Reactive Orange 16 and 40 to 3 wt.% of C.I. Reactive Orange 7, and 5 to 100 parts by weight per 100 parts by weight of said dye mixture of
   a naphthalenesulfonic acid/formaldehyde condensate having a sulfonation degree of 100 to 200%.

5. Cellulose fibers dyed by the method of claim 4.

* * * * *